(12) United States Patent
Chang et al.

(10) Patent No.: US 9,535,521 B2
(45) Date of Patent: Jan. 3, 2017

(54) TOUCH PANEL

(71) Applicants: Interface Optoelectronics Corporation, Shenzhen (CN); General Interface Solution Limited, Miaoli County (TW)

(72) Inventors: Chih-Peng Chang, Shenzhen (CN); Te-Jen Tseng, Shenzhen (CN); Ying-Chieh Chiang, Shenzhen (CN); Tzu-Hsiang Lin, Shenzhen (CN); Yen-Heng Huang, Taoyuan County (TW)

(73) Assignees: INTERFACE OPTOELECTRONICS CORPORATION, Shenzhen (CN); GENERAL INTERFACE SOLUTION LIMITED, Miaoli County (TW)

( * ) Notice: Subject to any disclaimer, the term of this patent is extended or adjusted under 35 U.S.C. 154(b) by 134 days.

(21) Appl. No.: 14/555,728

(22) Filed: Nov. 28, 2014

(65) Prior Publication Data

US 2016/0147324 A1 May 26, 2016

(30) Foreign Application Priority Data

Nov. 21, 2014 (CN) .......................... 2014 1 0674881

(51) Int. Cl.
*G06F 3/041* (2006.01)

(52) U.S. Cl.
CPC ..................... *G06F 3/041* (2013.01)

(58) Field of Classification Search
CPC ................. G06F 3/041; G06F 3/044
See application file for complete search history.

(56) References Cited

U.S. PATENT DOCUMENTS

| 9,086,772 | B2* | 7/2015 | Lee | G06F 3/044 |
| 2005/0237439 | A1* | 10/2005 | Mai | G06F 3/045 349/12 |
| 2011/0261010 | A1* | 10/2011 | Nishitani | G06F 3/044 345/174 |
| 2011/0316803 | A1* | 12/2011 | Kim | G06F 3/044 345/173 |
| 2012/0075218 | A1* | 3/2012 | Lin | G06F 3/0418 345/173 |
| 2012/0229395 | A1* | 9/2012 | Shin | G06F 3/0418 345/173 |
| 2013/0154979 | A1* | 6/2013 | Li | G06F 3/041 345/173 |
| 2013/0229364 | A1* | 9/2013 | Yu | G06F 3/044 345/173 |
| 2014/0320761 | A1* | 10/2014 | Misaki | G06F 3/044 349/12 |
| 2016/0147324 | A1* | 5/2016 | Chang | G06F 3/041 345/173 |

\* cited by examiner

*Primary Examiner* — Amare Mengistu
*Assistant Examiner* — Crystal A Mathews
(74) *Attorney, Agent, or Firm* — CKC & Partners Co., Ltd.

(57) ABSTRACT

A touch panel includes a substrate, plural conducting wires, an insulating layer, and a ground layer. The substrate includes an active region and a peripheral region surrounding the active region. The conducting wires are disposed in the peripheral region and extend along a first direction. The insulating layer is disposed on the conductive wires. The ground layer is disposed at an edge of the peripheral region and at least partially on the insulating layer, and the ground layer is at least partially in contact with the substrate.

11 Claims, 4 Drawing Sheets

TOUCH PANEL

RELATED APPLICATIONS

This application claims priority to China Application Serial Number 201410674881.5, filed Nov. 21, 2014, which is herein incorporated by reference.

BACKGROUND

Field of Invention

The present invention relates to touch panels.

Description of Related Art

As the development of smart products such as smart phones, display devices with touch panels has become mainstream in the market. One of the present industrial development tendency of touch display devices is toward thin bezels, or even without bezels.

For the touch-panel display devices, the effective area where the users can watch and touch is always limited by the circuit configurations of touch panels. Considering the current feasibility of the fabrication, the restriction in reducing space by the design of jig machines, and the decreased yield rates with the thinner bezels, the achievement of narrowing bezels of the touch display are limited. In addition, in the circuit configurations of the touch panels, an effect of electro static discharge may occur between the ground wire and other conducting wires. As a result, the ground wire is often spaced apart from other conducting wires at a certain distance for preventing the effect of electro static discharge, which makes the narrowing of bezels of the touch display devices even harder.

SUMMARY

Embodiments of the present invention provide a touch panel configured with an insulating layer and a conductive material that is crack resistant. A ground layer made of the conductive material is disposed on the insulating layer to prevent the effect of electro static discharge between the ground layer and the conducting wires. Therefore, the bezels of the touch display devices can be narrowed.

According to one embodiment of this invention, a touch panel includes a substrate, plural conducting wires, an insulating layer, and a ground layer. The substrate includes an active region and a peripheral region surrounding the active region. The conducting wires are disposed in the peripheral region and extend along a first direction. The insulating layer is disposed on the conductive wires. The ground layer is disposed at an edge of the peripheral region and at least partially on the insulating layer, and the ground layer is at least partially in contact with the substrate.

In one or more embodiments, a side surface of the substrate and a side surface of the ground layer define a plane, and the plane is parallel with the first direction.

In one or more embodiments, the insulating layer comprises a sidewall, the sidewall is proximate to a side surface of the substrate and parallel with the first direction, and the ground layer covers the sidewall.

In one or more embodiments, there is a first distance from the sidewall to a side surface of one of the conducting wires proximate to the sidewall, there is a second distance from a top surface of the conducting wires to a top surface of the insulating layer, and a sum of the first distance and the second distance is not less than 100 micrometers.

In one or more embodiments, there is a third distance from the sidewall to the side surface of the substrate, there is a fourth distance from the sidewall to a side surface of an edge of the ground layer covering the insulating layer, and a sum of the third distance and the fourth distance is not less than 50 micrometers.

In one or more embodiments, a ratio of the fourth distance to the third distance is in a range from about 0.1 to about 10.

In one or more embodiments, a material of the ground layer has a higher extensibility than that of the conducting wires.

In one or more embodiments, the ground layer is made of silver.

In one or more embodiments, the touch panel further includes plural contact pads and plural sensing electrode series, the contact pads are disposed in the peripheral region, the sensing electrode series are disposed in the active region, the contact pads are electrically connected to the sensing electrode series, and the conducting wires are connected to the contact pads respectively.

In one or more embodiments, the insulating layer at least partially covers the contact pads.

In one or more embodiments, the touch panel further includes a protective layer covering the ground layer.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
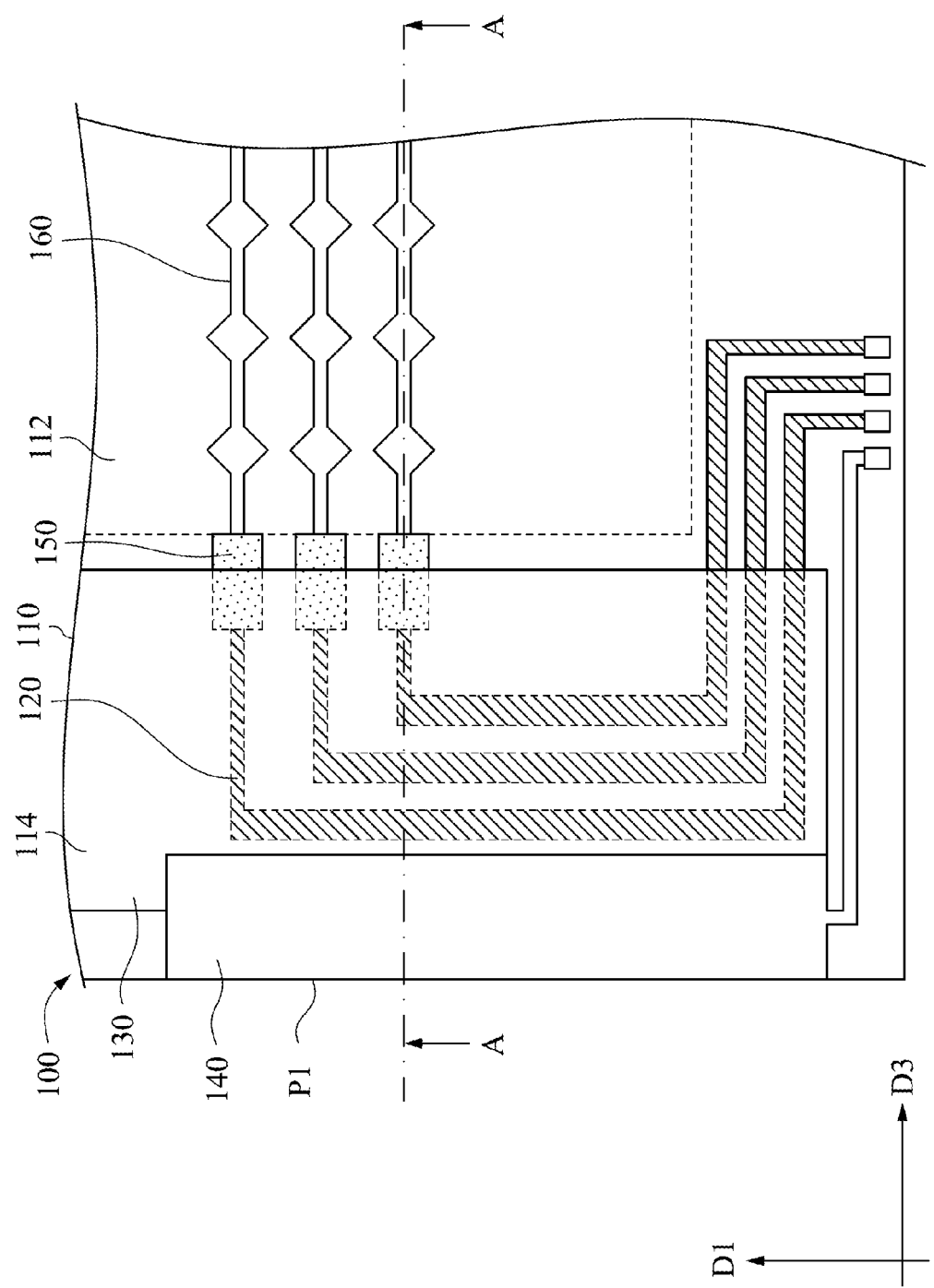
FIG. 1 is a top view of a touch panel according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a top view of a touch panel 100 according to one embodiment of the present invention. The touch panel 100 includes a substrate 110, plural conducting wires 120, an insulating layer 130, and a ground layer 140. The substrate 110 includes an active region 112 and a peripheral region 114 surrounding the active region 112. The conducting wires 120 are disposed in the peripheral region 114 of the substrate 110, and extend along a first direction D1. The insulating layer 130 is disposed on the conductive wires 120. The ground layer 140 is disposed at an edge of the peripheral region 114 and at least partially on the insulating layer 130, and the ground layer 140 is at least partially in contact with the substrate 110.

In one or more embodiments of the present invention, the touch panel 100 further includes plural contact pads 150 and plural sensing electrode series 160. The contact pads 150 are disposed in the peripheral region 114 of the substrate 110, and the sensing electrode series 160 are disposed in the active region 112 of the substrate 110. The sensing electrode series 160 can be made of transparent conductive materials, and the contact pads 150 can be made of transparent conductive materials or opaque conductive materials.

The sensing electrode series 160 is used for detecting a touch position, and the contact pads 150 are connected to the sensing electrode series 160. The conducting wires 120 are connected to the contact pads 150 respectively for enabling the electric current to flow and transmitting the touch information. In addition, the conducting wires 120 and the ground layer 140 can be connected to other circuit chips for transmitting the touch information and acquiring the touch position by calculation. In other words, through the contact pads 150 and the conducting wires 120, the sensing electrode series 160 can be electrically connected to other circuit chips.

In one or more embodiments of the present invention, the insulating layer 130 is disposed in the peripheral region 114, and the insulating layer 130 at least partially covers the contact pads 150. It should be noted that a part of the conducting wires 120 and a part of the contact pads 150 are depicted with dashed lines to indicate that they are covered by the insulating layer 130, and the other part of the conducting wires 120 and the other part of the contact pads 150 are depicted with solid lines to indicate that they are not covered by the insulating layer 130. However, the configuration of the contact pads 150 should not limit the scope of the present invention, the contact pads 150 can be not covered by the insulating layer 130 or totally covered by the insulating layer 130 according to practical situations.

Figure 2:
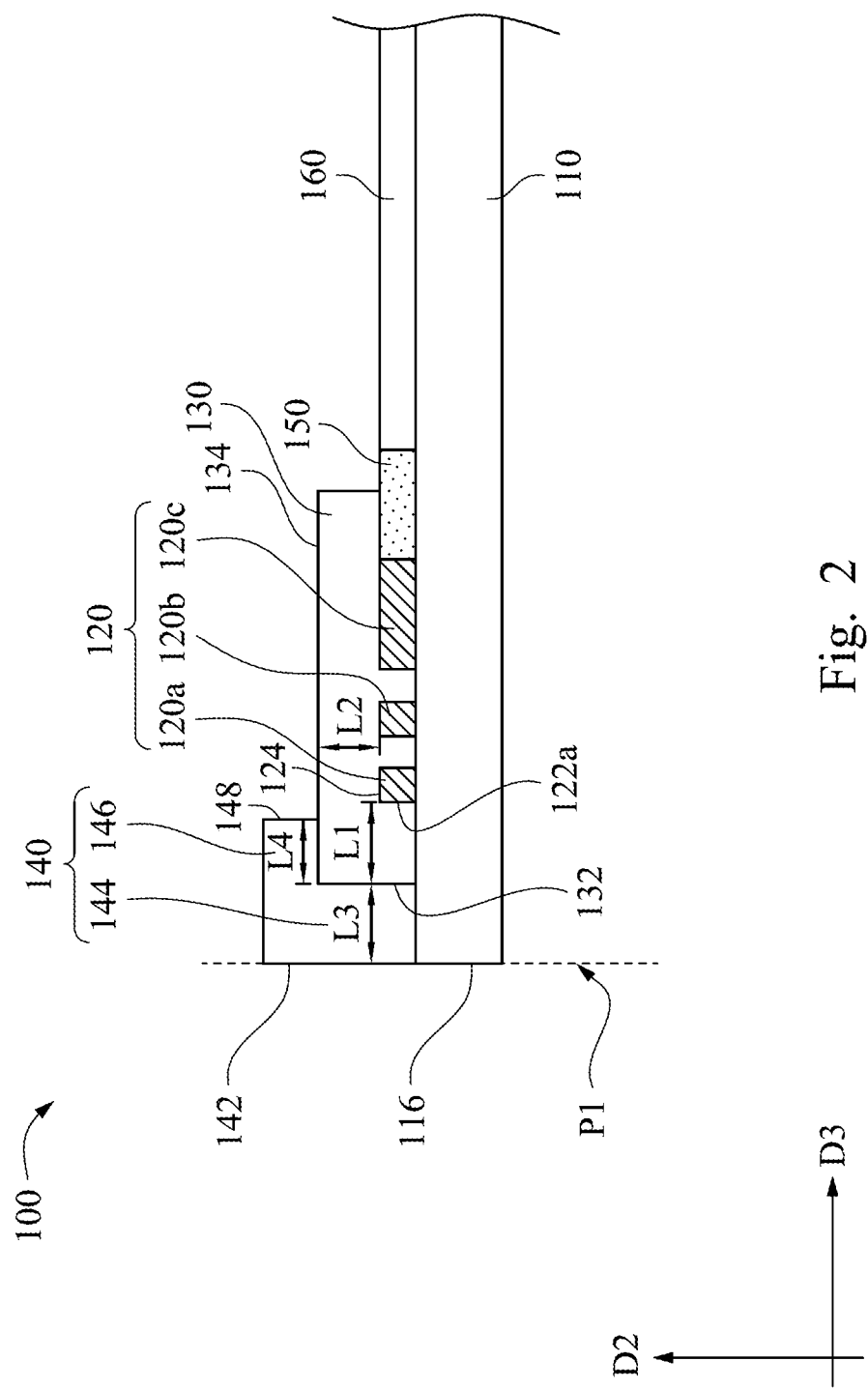
FIG. 2 is a cross-sectional view of the touch panel of FIG. 1.

FIG. 2 is a cross-sectional view of the touch panel 110 along a line A-A of FIG. 1. In one or more embodiments of the present invention, a side surface 116 of the substrate 110 and a side surface 142 of the ground layer 140 define a plane P1. Ideally, the plane P1 is parallel with the first direction D1 (referring to FIG. 1) and a second direction D2. Herein, the first direction D1 is parallel with the substrate 110, and the second direction D2 is perpendicular to the substrate 110.

In this embodiment, though the thicknesses of the conducting wires 120, the contact pads 150, and the sensing electrode series 160 are configured to be the same, it should not limit the scope of the present invention. The thicknesses of the conducting wires 120, the contact pads 150, and the sensing electrode series 160 can be configured to be different. Herein, for simplifying the illustration, the number of the conducting wires is simplified to be three, but it should not limit the scope of the present invention.

Reference is now made to FIG. 1 and FIG. 2, in one or more embodiments of the present invention, the ground layer 140 covers a sidewall 132 of the insulating layer 130, and the sidewall 132 is proximate to the side surface 116 of the substrate 110 and parallel with the first direction D1. In one or more embodiments of the present invention, the ground layer 140 is connected to the substrate 110 and the insulating layer 130 along a third direction D3. To be specific, an end 144 of the ground layer 140 is disposed on the substrate 110 and in contact with the substrate 110, and the other end 146 of the ground layer 140 is disposed on the insulating layer 130 and in contact with the insulating layer 130. The third direction D3 is parallel with the substrate 110, and perpendicular to the first direction D1 and the second direction D2.

In this embodiment, a projection of the ground layer 140 on the substrate 110 is of a shape of long bars extending along the first direction D1. In other words, the projection of the ground layer 140 on the substrate 110 is parallel with the conducting wires 120, but it should not limit the scope of the present invention, and the ground layer 140 can be arranged in other ways.

In one or more embodiments of the present invention, the conducting wires 120 include conducting wires 120a, 120b, and 120c. The conducting wire 120a is proximate to the sidewall 132 of the insulating layer 130, and has a side surface 122a. There is a first distance L1 from the sidewall 132 to the side surface 122a. There is a second distance L2 from a top surface 124 of the conducting wires 120 to a top surface 134 of the insulating layer 130. In the configuration of the insulating layer 130, a sum of the first distance L1 and the second distance L2 can be designed to be not less than 100 micrometers.

For a traditional touch panel without the insulating layer 130, a distance between the conducting wires 120 and the ground layer 140 is usually at least greater than 100 micrometers, and therefore an effect of the electrode static discharge can be prevented effectively. In this embodiment, with the configuration of the insulating layer 130, the ground layer 140 can be separated and isolated from the conducting wires 120 effectively, and the effect of the electrode static discharge can be prevented. The distance between the conducting wires 120 and the ground layer 140 can be slightly reduced. For example, the first distance L1 can be about 50 micrometers, the second distance L2 can be about 50 micrometers, and therefore the diagonal is about 70 micrometers.

In one or more embodiments of the present invention, there is a third distance L3 from the sidewall 132 to the plane P1. The ground layer 140 has a side surface 148 on the end 146 covering the insulating layer 130. There is a fourth distance L4 from the sidewall 132 to the side surface 148. In the configuration of the ground layer 140, a sum of the third distance L3 and the fourth distance L4 is not less than 50 micrometers, and a ratio of the fourth distance L4 to the third distance L3 is in a range from about 0.1 to about 10. For example, the third distance L3 can be about 5 micrometers, and the fourth distance L4 can be about 45 micrometers. It is noted that, as previous illustration, the ground layer 140 is disposed at least partially on the insulating layer 130, and the ground layer 140 is disposed at least partially on the substrate 110. As a result, the third distance L3 or the fourth distance L4 is not zero.

In some embodiments of the present invention, with the configuration of the third distance L3 and the fourth distance L4, the length of the two ends 144, 146 of the ground layer 140 can be ensured, and the area of the ground layer can be enhanced. Therefore, the ability of the ground layer 140 to bear the electric current can be enhanced, and the effect of electro static discharge between the ground layer 140 and the conducting wires 120 can be prevented from resulting some touch problems.

In one or more embodiments of the present invention, the material of the insulating layer 130 can be insulating inks or other insulating materials. The insulating layer 130 is used for protecting the contact pads 150 from oxidation or peeling and isolating the ground layer 140 from the conducting wires 120. In addition, the insulating layer 130 can also offer a smooth base for additional layers stacked on the conducting wires 120 in the later fabrication processes.

In one or more embodiments of the present invention, the material of the ground layer 140 can have a high extensibility, such as a silver paste for screen-printing, or a silver paste for laser patterning.

In some embodiments, the material of the ground layer 140 can be different from the material of the conducting wires 120. The material of the ground layer 140 can have a higher extensibility than that of the conducting wires 120, and the material of the conducting wires 120 can be arranged more precisely than that of the ground layer 140.

For example, the material of the ground layer 140 can be silver, and the material of the conducting wires 120 can be copper. The silver metal can be generally arranged by printing processes, and the copper metal can be arranged by etching processes. Since the printing processes may result in some inaccuracy problems, by configuring the insulating layer 130 to isolate the ground layer 140 from the conducting wires 120, the conducting wires 120 can be prevented from being contaminated by the ground layer 140 which are arranged inaccurately. In some embodiment, the conducting wires 120 can be made of transparent conductive materials.

In some embodiments of the present invention, since the ground layer 140 have a high extensibility, the substrate 110 and the ground layer 140 can be cut through laser cutting, mechanical cutting, or other method directly to form the plane P1, and the ground layer 140 is prevented from cracking. In contrast, in the traditional configuration of touch panel, the side surface 142 of the ground layer 140 does not form a plane with the side surface 116 of the substrate 110, but keeps a determined distance from the side surface 116 of the substrate 110. The determined distance is used for cutting the substrate 110 and preventing the ground layer 140 from cracking.

Compare to the traditional configuration, in this embodiment, since the ground layer 140 is made of the material with a high extensibility, the problem of the cracking of the ground layer 140 is solved. Therefore, it is not necessary to keep a determined distance from the side surface 116 of the substrate 110 to the side surface 142 of the ground layer 140, and the width of the peripheral region 114 can be narrowed. That is, the width of the bezels of the touch display device can be narrowed.

In the above embodiments, the projection of the ground layer 140 on the substrate 110 is not overlapped with the projection of the conducting wire 120a on the substrate 110. That is, the fourth distance L4 is less than the first distance L1. However, it should not limit the scope of the present invention, and the fourth distance L4 can be greater than or equal to the first distance L1.

Figure 3:
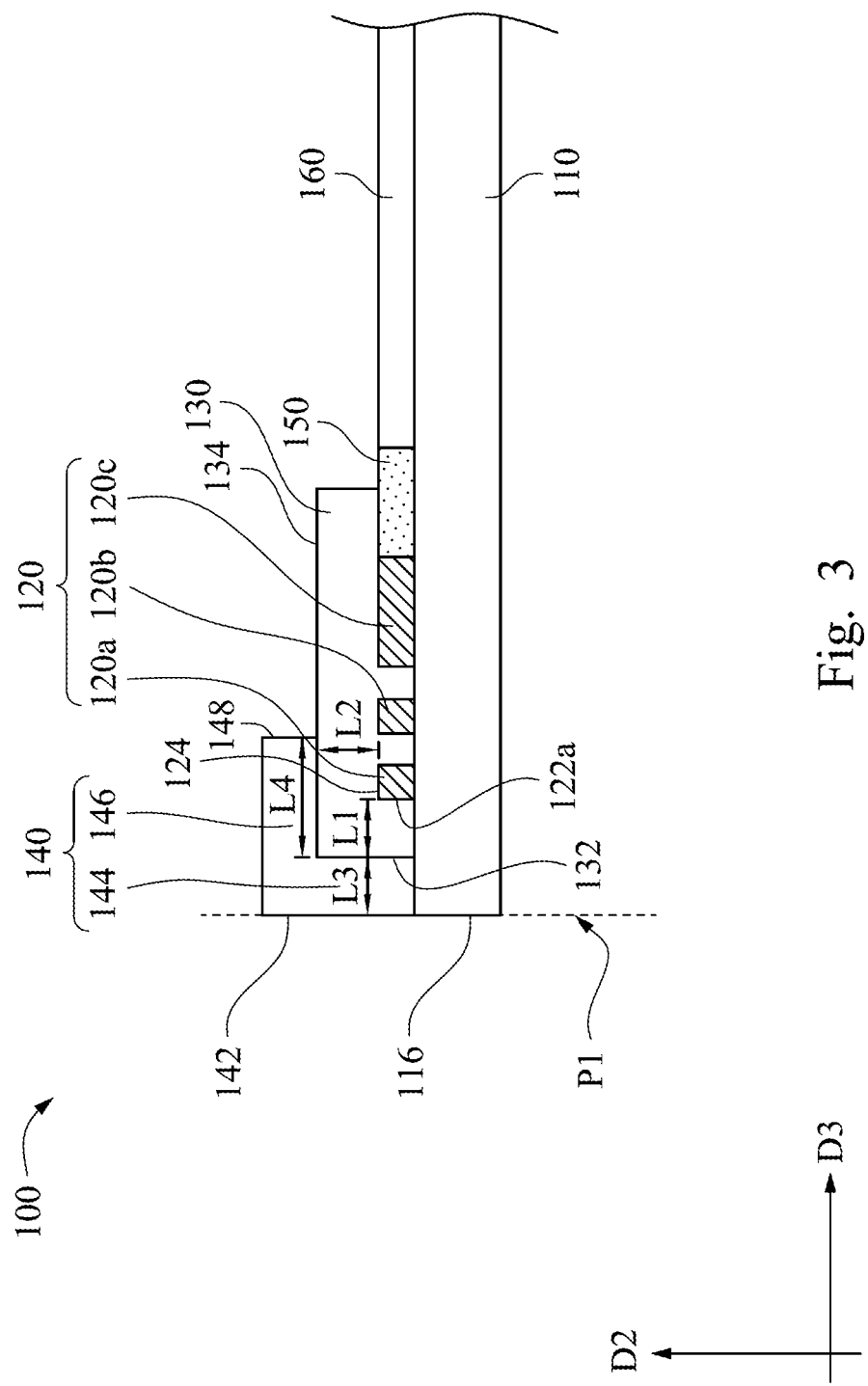
FIG. 3 is a top view of a touch panel according to another embodiment of the present invention.

FIG. 3 is a top view of a touch panel 100 according to another embodiment of the present invention. This embodiment is substantially similar to the embodiment of FIG. 2. The difference is that, in this embodiment, the projection of the ground layer 140 on the substrate 110 is overlapped with the projection of the conducting wire 120a on the substrate 110. To be specific, the fourth distance L4 is greater than the first distance L1, and therefore the ground layer 140 covers the top of the conducting wires 120.

Therefore, the first distance L1 between the conducting wire 120a and the sidewall 132 can be narrowed, thereby narrowing the width of the peripheral region 114 and achieving the target of the thin bezels.

In addition, as the effect of the embodiment of FIG. 2, in this embodiment, it is not necessary to keep a determined distance from the side surface 116 of the substrate 110 to the ground layer 140 for preventing the cracking of the ground layer 140 during the processes of laser cutting or mechanical cutting. Therefore, the width of the peripheral region 114 can be narrowed, and the width of the bezels of the touch display device can also be narrowed.

Other detailed arrangements are similar to the embodiment of FIG. 2, and are not repeated herein.

Figure 4:
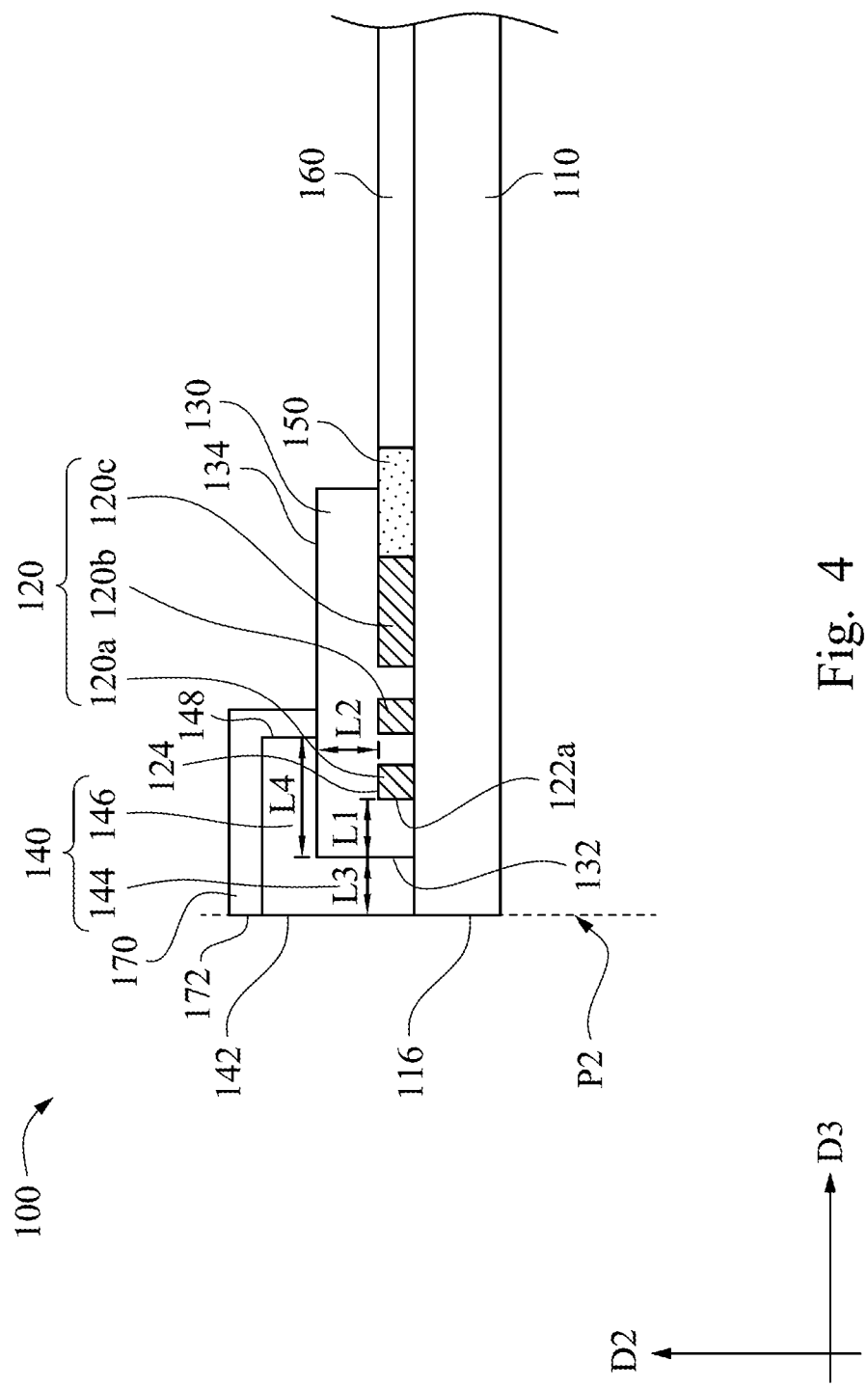
FIG. 4 is a top view of a touch panel according to another embodiment of the present invention.

FIG. 4 is a top view of a touch panel 100 according to another embodiment of the present invention. This embodiment is substantially similar to the embodiment of FIG. 2. The difference is that, in this embodiment, the touch panel 100 includes a protective layer 170 disposed on the ground layer 140, and the protective layer 170 covers ground layer 140. In some embodiments, the protective layer 170 can be partially disposed on the insulating layer 130 for fixing the ground layer 140 to insulating layer 130, protecting the ground layer 140 from peeling, and isolating the ground layer 140 from other electronic components.

In some embodiments, the protective layer 170 can have a side surface 172, and the side surface 172 of the protective layer 170, the side surface 116 of the substrate 110 and the side surface 142 of the ground layer 140 define a plane P2. As previous illustration, since the ground layer 140 have a high extensibility, the substrate 110, the ground layer 140, and the protective layer 170 can be cut through laser cutting, mechanical cutting, or other method directly to form the plane P2, and the ground layer 140 is prevented from cracking.

In some embodiment, the insulating layer 130 and the protective layer 170 can be made of the same materials, such as insulating inks and other insulating materials. In other embodiments, insulating layer 130 and the protective layer 170 can be made of different materials.

Other detailed arrangements are similar to the embodiment of FIG. 2, and are not repeated herein.

The invention provides a touch panel configured with a ground layer which is made of a conductive material uneasy to crack, the ground layer and the substrate can be cut together, and therefore it is not necessary to keep a distance between the ground layer and the substrate. In addition, by the configuration of the insulating layer, the effect of electro static discharge between the ground layer and the conducting wires can be prevented. Therefore, the bezels of the touch display devices can be narrowed effectively.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch panel, comprising:
    a substrate comprising an active region and a peripheral region surrounding the active region;
    a plurality of conducting wires disposed on one surface of the substrate in the peripheral region and extending along a first direction;
    an insulating layer disposed on the conductive wires, and the insulating layer comprising a top surface, a bottom surface opposite to the top surface, and a sidewall connected to the top surface and the bottom surface therebetween, wherein the bottom surface is in contact with the surface of the substrate; and
    a ground layer disposed at an edge of the peripheral region and provided with a L type body, wherein one part of the L type body is in contact with the surface of the substrate and the sidewall of the insulating layer, and the other part of the L type body is in contact with the top surface of the insulating layer, and the insulating layer is sandwiched between the substrate and the ground layer.

2. The touch panel of claim 1, wherein a side surface of the substrate and a side surface of the ground layer define a plane which is parallel with the first direction.

3. The touch panel of claim 1, wherein the sidewall of the insulating layer is proximate to a side surface of the substrate and parallel with the first direction, and the ground layer covers the sidewall.

4. The touch panel of claim 3, wherein there is a first distance from the sidewall of the insulating layer to a side surface of one of the conducting wires proximate to the sidewall of the insulating layer, there is a second distance from a top surface of the conducting wires to the top surface of the insulating layer, and a sum of the first distance and the second distance is not less than 100 micrometers.

5. The touch panel of claim 3, wherein there is a third distance from the sidewall of the insulating layer to the side surface of the substrate, there is a fourth distance from the sidewall of the insulating layer to a side surface of an edge of the ground layer covering the insulating layer, and a sum of the third distance and the fourth distance is not less than 50 micrometers.

6. The touch panel of claim 5, wherein a ratio of the fourth distance to the third distance is in a range from about 0.1 to about 10.

7. The touch panel of claim 1, wherein a material of the ground layer has a higher extensibility than that of the conducting wires.

8. The touch panel of claim 1, wherein the ground layer is made of silver.

9. The touch panel of claim 1, further comprising a plurality of contact pads and a plurality of sensing electrode series, wherein the contact pads are disposed in the peripheral region, the sensing electrode series are disposed in the active region, the contact pads are electrically connected to the sensing electrode series, and the conducting wires are connected to the contact pads respectively.

10. The touch panel of claim 9, wherein the insulating layer at least partially covers the contact pads.

11. The touch panel of claim 1, further comprising a protective layer covering the ground layer.

* * * * *